Oct. 12, 1965  A. MOTTU  3,211,025
APPARATUS FOR COMPENSATING THE DEFLECTION OF A SLIDING
SPINDLE HAVING A NON-VERTICAL AXIS
Filed Nov. 4, 1963  5 Sheets-Sheet 1
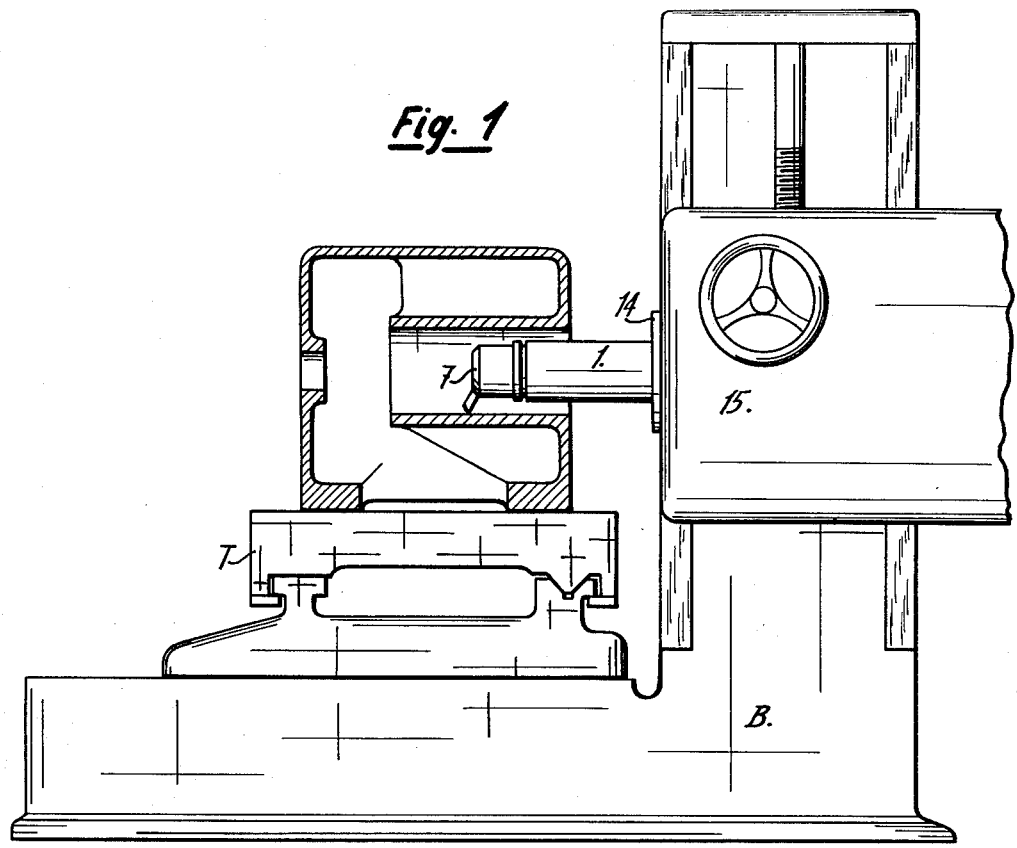
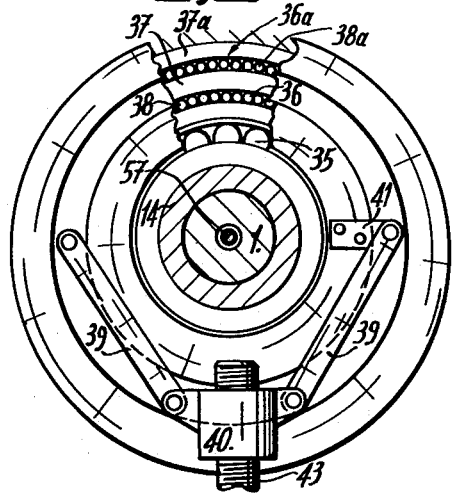
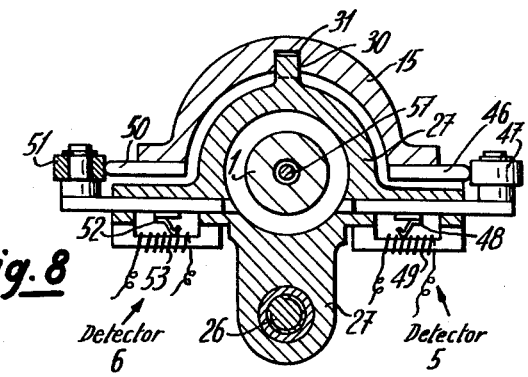
INVENTOR
ANDRE MOTTU
By Irwin S. Thompson
ATTY.

INVENTOR
ANDRE MOTTU
ATTY.

INVENTOR
ANDRE MOTTU
By Irwin S. Thompson
ATTY.

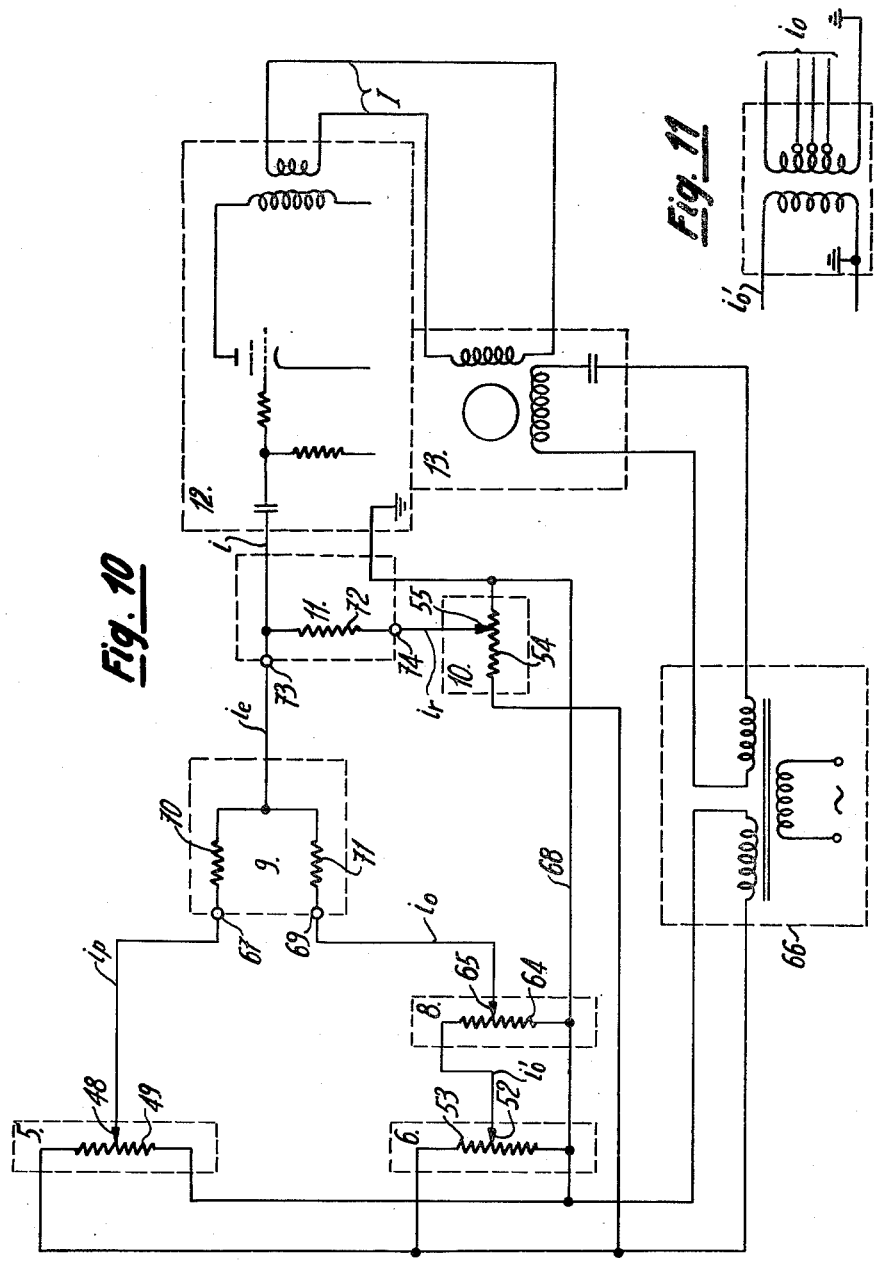

United States Patent Office 3,211,025
Patented Oct. 12, 1965

3,211,025
APPARATUS FOR COMPENSATING THE DEFLECTION OF A SLIDING SPINDLE HAVING A NON-VERTICAL AXIS
André Mottu, Geneva, Switzerland, assignor to Societe Genevoise d'Instruments de Physique, Geneva, Switzerland, a corporation of Switzerland
Filed Nov. 4, 1963, Ser. No. 321,097
Claims priority, application Switzerland, Dec. 7, 1962, 14,414/62
6 Claims. (Cl. 77—3)

This invention relates to a device for compensating the deflection of an axially sliding spindle having its axis in a non-vertical position.

In most machine-tools such as boring machines provided with a horizontal spindle, the spindle is mounted to slide horizontally. However, due to the weight of the spindle itself, and eventually the weight of the sheath bearing said spindle, and to the weight of the tool placed at the end of it, the spindle undergoes a deflection which depends on the amount of its overhang.

The variation of this deflection has two main effects:

For the same position of the headstock carrying the spindle, the height of the tool varies with the axial position of the spindle.

The axis of a bore obtained by axial translation of the spindle is not rectilinear.

In practice, the errors of position and the misalignments resulting from the deflection of the spindle amount to several hundredths of a millimetre, and are not compatible with the precision of about one thousandth of a millimetre which is required from certain machines.

The variation of the deflection of the spindle affects also the measuring machines in which a sliding spindle, bearing at its end a measuring instrument, may take different horizontal or oblique positions.

In order to reduce the deflection, the simplest way is of course to reduce the overhang of the spindle and on certain machines, the displacement of the said spindle has been avoided or suppressed. The spindle is fixed and its displacement is replaced by the displacement of the workpiece. This solution is not without drawbacks. In fact, the displacement of the workpiece involves displacement of the table which supports the piece and consequently the setting in movement of considerable masses and an increase of the overhangs of the table, of the carriage and of the frame. The bending variations of the different members due to the displacement of heavy masses on the one hand, and to the decrease in rigidity resulting from the increase of the overhangs on the other hand, are finally the cause of guiding and position errors at least as great as those which one seeks to eliminate by reducing the overhang of the spindle.

Further, other machines are equipped with a device for correcting or compensating for the deflection, due to the weight of the spindle itself, through the angular deviation of the slides bearing the headstock carrying the spindle by means of a supporting roller. This solution is however not satisfactory either, since, on the one hand, the frame of the machine is subjected to very large and concentrated forces which cause important bending and, on the other hand, nothing has been taken into account for the deflection of the spindle due to the weight of the tool carried by the said spindle.

The principal object of the present invention is to provide a device compensating for the deflection of a sliding spindle having a non-vertical axis which remedies the drawbacks inherent in the prior art.

Another aim of this invention is to provide a spindle deflection compensating device that comprises at least one movable bearing of the spindle, displaceable under the action of an actuating device, the position of which is brought under the control, on the one hand, of the overhanging length of the spindle and, on the other hand, of the weight of a tool placed at the free end of the said spindle in such a way that, whatever the axial position of the spindle and whatever the weight of the tool carried by the said spindle, the axis of the said tool will always be located on the theoretical axis of the spindle.

The annexed drawing shows schematically and by way of example one embodiment of the device for compensating for the deflection of a spindle having a non-vertical axis and some modifications thereof.

FIG. 1 is a partial view from above of a machine-tool comprising a spindle having a horizontal axis.

FIG. 8 is a cross sectional view taken on line VIII—VIII of FIG. 7.

FIG. 9 is a sectional view taken on line IX—IX of FIG. 7 with portions taken away.

FIG. 10 is an electrical circuit diagram showing the detailed contents of the circuits indicated in block form in FIG. 6.

FIG. 11 illustrates a modification of the multiplier circuit.

Figure 2:
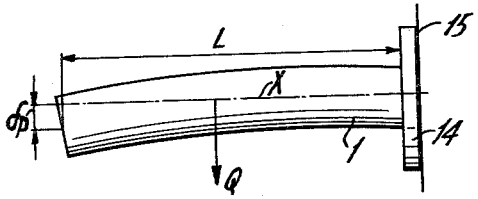
FIG. 2 is an elevational view of the spindle of the machine in FIG. 1 showing in an exaggerated manner the deflection of the portion of the spindle projecting out of the headstock under the action of its own weight.

Referring to the drawings, there is shown a compensating device according to this invention for the deflection of a rotary and axially sliding spindle 1 having a non-vertical axis of a machine comprising a frame B and a work carrying table T.

The deflection of such a spindle is composed, on the one hand, of the deflection due to the weight of the spindle 1 itself and, on the other hand, of the deflection due to the weight of the tool carried by the free end of the said spindle.

(a) The deflection due to the weight of the spindle itself as indicated in FIG. 2 is given by the following expression, if the spindle is considered as a beam of constant cross section and density and fixed at one of its ends:

$$\delta p = \frac{Q.L^3}{E.J.8}$$

in which:

$\delta p$ is the deflection of the spindle due to its own weight.
Q is the weight of the overhanging portion of the spindle.
L is the overhanging length of the spindle.
E is the modulus of elasticity of the spindle.
J is the moment of inertia of the spindle.

For a given spindle the values E and J are constant whereas the weight Q varies linearly with the overhanging length of the spindle, the weight per unit length of the spindle being constant. In these conditions the deflection of the spindle due to its own weight can be expressed by:

$$\delta p = (\text{constant}) \cdot L^4$$

(b) The deflection due to the weight of the tool carried by the free end of the spindle is given by the following expression if the spindle is considered as a beam fixed at one of its ends and subjected to a load concentrated at its free end:

$$\delta o = \frac{P \cdot L^3}{E \cdot J \cdot 3}$$

in which:

$\delta o$ is the deflection of the spindle due to the weight of the tool.
P is the weight of the tool.
L is the overhanging length of the spindle.
E is the modulus of elasticity of the spindle.
J is the moment of inertia of the spindle.

Here too, for a given spindle the values of E and J are constant and the deflection of the spindle under the weight of the tool may be expressed by:

$$\delta o = (\text{constant}) \cdot P \cdot L^3$$

The total deflection of the spindle may thus be expressed as being a function of the type:

$$\delta tot = K(\delta p; \delta o) = f(L; P)$$

For this development to be exact the length L has to correspond to the distance separating the free end of the spindle from the place where the actual axis of the said spindle is, whatever the axial position of the spindle and whatever the weight of the tool carried by the said spindle, parallel to the theoretical axis of the said spindle.

Figure 5:
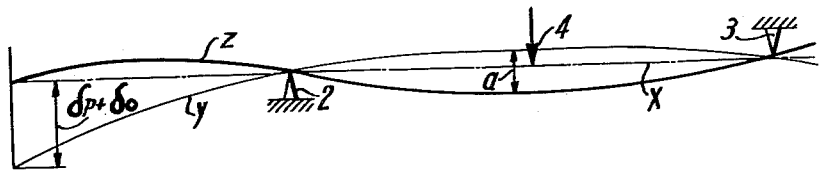
FIG. 5 is a diagrammatic view showing the shape taken by the axis of the spindle under the effect of its own weight and the weight of the tool carried by the said spindle before and after compensation for its deflection.

FIG. 5 shows diagrammatically the principle of compensation for the total deflection $(\delta p + \delta o)$ of the spindle 1.

In this FIG. 5 the fixed bearings 2 and 3 are represented as bearings enabling the axis X of the spindle to move angularly at these points.

The dot and dash line illustrates the theoretical axis X of the spindle, whereas the fine continuous line illustrates the shape taken by the axis of the spindle under the effect of its own weight and of the weight of the tool which is carried by the said spindle.

The composition of the total deflection $(\delta p + \delta o)$ is effected by downwards displacing (FIG. 5) the adjustable bearing 4 which causes the bending of the spindle between the fixed bearings 2, 3 and the rectifying of the overhanging portion of the spindle, as indicated by the heavy line z.

When the compensation of the deflection is complete, the shape of the axis of the spindle (FIG. 5, line z) is that of a curved line intersecting the theoretical axis X of the spindle in vertical planes containing the end of the tool 7, the front bearing 2 and the rear bearing 3.

It is to be noted that the amplitude $a$ of the displacement of the adjustable bearing 4 is a function of the total deflection $(\delta p + \delta o)$ of the spindle; this amplitude $a$ is therefore a function of the type $f_1$ (L;P).

Figure 6:
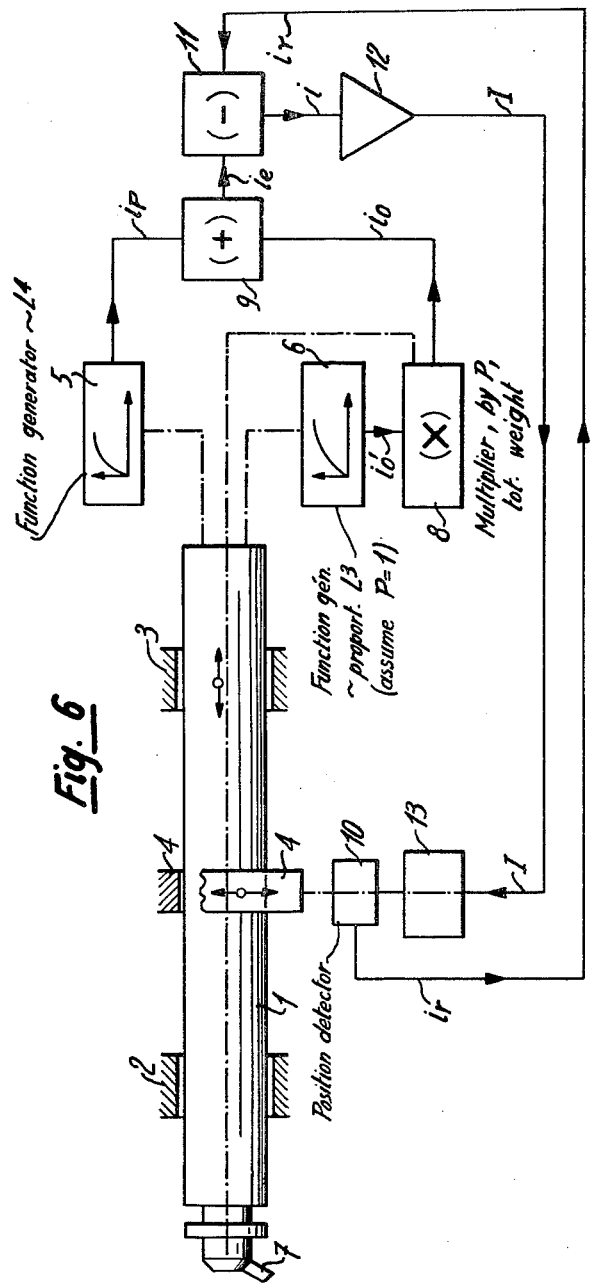
FIG. 6 is an electro-mechanical principle scheme, in block form, of the compensating device for the deflection of a spindle, in which the electrical connections are represented by full lines whereas the mechanical linkages are shown in dashed lines.

FIG. 6 shows diagrammatically the working principle of the device for compensating the deflection of the spindle 1. This spindle slides axially in fixed bearings 2 and 3. The compensating device comprises a movable bearing for the spindle 1 constituted by a bearing 4 displaceable in a plane perpendicular to the axis of the spindle 1 and located between the front and rear bearings 2 and 3 of the spindle.

In the embodiments shown this displacement takes place in a vertical direction, but generally the displacement of the movable bearing 4 takes place along a straight line defined as the intersection between a plane perpendicular to the theoretical axis X of the spindle and a plane containing the theoretical axis X of the said spindle.

In order to realize the total compensation of the deflection, whatever the axial position of the spindle and whatever the tool, that is to say the weight of the said tool, which is carried by the free extremity of the spindle, the amplitude of the displacement of the bearing 4 has to be a function of the total deflection of the spindle, that is to say, a function of the weight of the tool carried by the spindle and of the overhanging length of the said spindle, namely $f_1$ (L;P) as mentioned above.

The displacement of the movable bearing 4 is controlled in function of the axial position of the spindle 1. These displacements are controlled by a control device delivering an error signal proportional to the said function $f_1$ (L;P).

With reference to FIG. 6 in which the mechanical linkages are shown in dotted lines whereas the electrical connections are shown in full lines in order to show diagrammatically the electro-mechanical links of the compensating device of the deflection, the control device comprises:

(a) A first detector 5, or function generator, mechanically connected to the spindle 1 and delivering a signal $ip$ which is a function of the axial position of the spindle (proportional to $L^4$). This signal $ip$ is thus proportional to the deflection of the spindle itself.

(b) A second detector 6, or function generator, mechanically connected to the spindle 1 and delivering a signal $io'$ which also depends upon the axial position of the spindle (proportional to $L^3$). This signal $io'$ is thus proportional to the deflection of the spindle due to the weight of a tool 7 of unit weight for example.

(c) A multiplier circuit 8 fed by the signal $io'$ and delivering a signal $io$ equal to the signal $io'$ multiplied by a coefficient depending upon the weight P of the tool 7 carried by the spindle. The introduction of the value of the coefficient corresponding to a given tool 7 may be achieved either automatically by means of a mechanical linkage of which a constructional example will be given later, or manually.

(d) An electric adder circuit 9 connected to detector 5 and multiplier 8 adding the two signals $ip$ and $io$ so as to form a signal $ie$ which is a function of the total deflection of the spindle 1. This signal $ie$ constitutes thus an input signal for the control device, which indicates, as a function of the axial position of the spindle and of the weight of the tool carried by the said spindle, and with respect to an origin which may be, for example, the position of the theoretical axis of the spindle, the distance or amount by which the adjustable bearing 4 has to be displaced in order that the deflection of the spindle at its free end be entirely compensated.

(e) A position detector 10 mechanically connected to the movable bearing 4 and delivering an electrical return signal $ir$ which is a function of the position of the said bearing 4. This signal $ir$ consitutes thus a signal corresponding to the actual position of the movable bearing 4.

(f) A comparator circuit 11 connected to adder circuit 9 and to the position detector 10 for comparing the signals $ie$ and $ir$ and delivering an error signal $i$ which is a function of the variation between the input signal $ie$ and the return signal $ir$.

(g) An amplifier 12 fed by the error signal $i$ and amplifying it in order to obtain a signal I intended to control the linear displacements of the bearing 4.

(h) An electric motor 13 controlled by the signal I and causing the displacements of the bearing 4 as a function of the value of the said signal I.

The control device described above is such that the signals $ie$ and $ir$ are equal when the axis of the tool 7 carried by the spindle is located on the theoretical axis X of the spindle, that is to say, when the deflection of the spindle at its free extremity is reduced to zero. This has naturally to be true for any axial position which the spindie may take and whatever the tool carried by the said spindle.

FIG. 10 shows one possible realization of the electrical circuits indicated in block form in FIG. 6. According to the electrical circuit diagram shown in FIG .10 the different blocks of FIG. 6 are realized in the following manner:

(a) The first function generator 5 comprises a potentiometer 49 fed with electrical current by means of a feeding device 66 comprising a transformer the primary winding of which is fed by the main power supply. The sliding contact 48 of said potentiometer 49 is electrically connected to a first input 67 of the added circuit 9 and its position is dependent of the axial position of the spindle (proportional to $L^4$).

(b) The second function generator 6 comprises a potentiometer 53 connected in parallel with the potentiometer 49 to the feeding device and the sliding contact 52 of which is electrically connected to the input of the multiplier 8. The position of said sliding contact is dependent of the axial position of the spindle (proportional to $L^3$).

(c) The multiplier circuit 8 is constituted by a potentiometer 64 connected between the ground lead 68 of the feeding device 66 and the rubbing contact 48 of the potentiometer 49. The output of the multiplier circuit 8 constituted by the rubbing contact 65 of the potentiometer 64 is electrically connected to a second input 69 of the added circuit 9.

(d) The electrical added circuit 9 is constituted by a first resistor 70 fed by the output of the first function generator 5 and a second resistor 71 fed by the output of the cultiplier circuit 8. Both said resistors 70, 71 are electrically connected to one input 79 of the comparator circuit 11.

(e) The position detector 10 is constituted by a potentiometer 54 connected to the feeding device 66 in parallel with the function generator 5 and 6 (potentiometers 49 and 53). The rubbing contact 55 of the potentiometer 54 is electrically connected to a second input 74 of the comparator circuit and is mechanically driven by the motor 13 actuating the movable bearing 4. The position of said rubbing contact 55 corresponds thus to the position of the movable bearing 4.

(f) The comparator circuit 11 is here realized in its simplest form, that is by a connection connecting the output of the adder circuit 9 to the output of the position detector 10 by means of a resistor 72. The output of said comparator circuit is connected to the amplifier 12. This circuit compares in fact the signals $io$ delivered by the adder circuit 9 and $ir$ delivered by the position detector 10. This circuit delivers to the amplifier 12 a signal $i$ depending from the difference of the outputs of the adder circuit 9 and of the position detector 10. In fact, if the output of the adder circuit 9 is the same as the one of the position detector 10, there is no current $i$ flowing to the amplifier. This means that the position of the movable bearing 4 is the one corresponding to the complete compensation of the deflection of the spindle 1.

If the outputs of the adder circuit 9 and of the position detector 10 are unequal the amplifier 12 is fed with a current $i$ the value of which depends from the difference of said two outputs.

Figure 7:
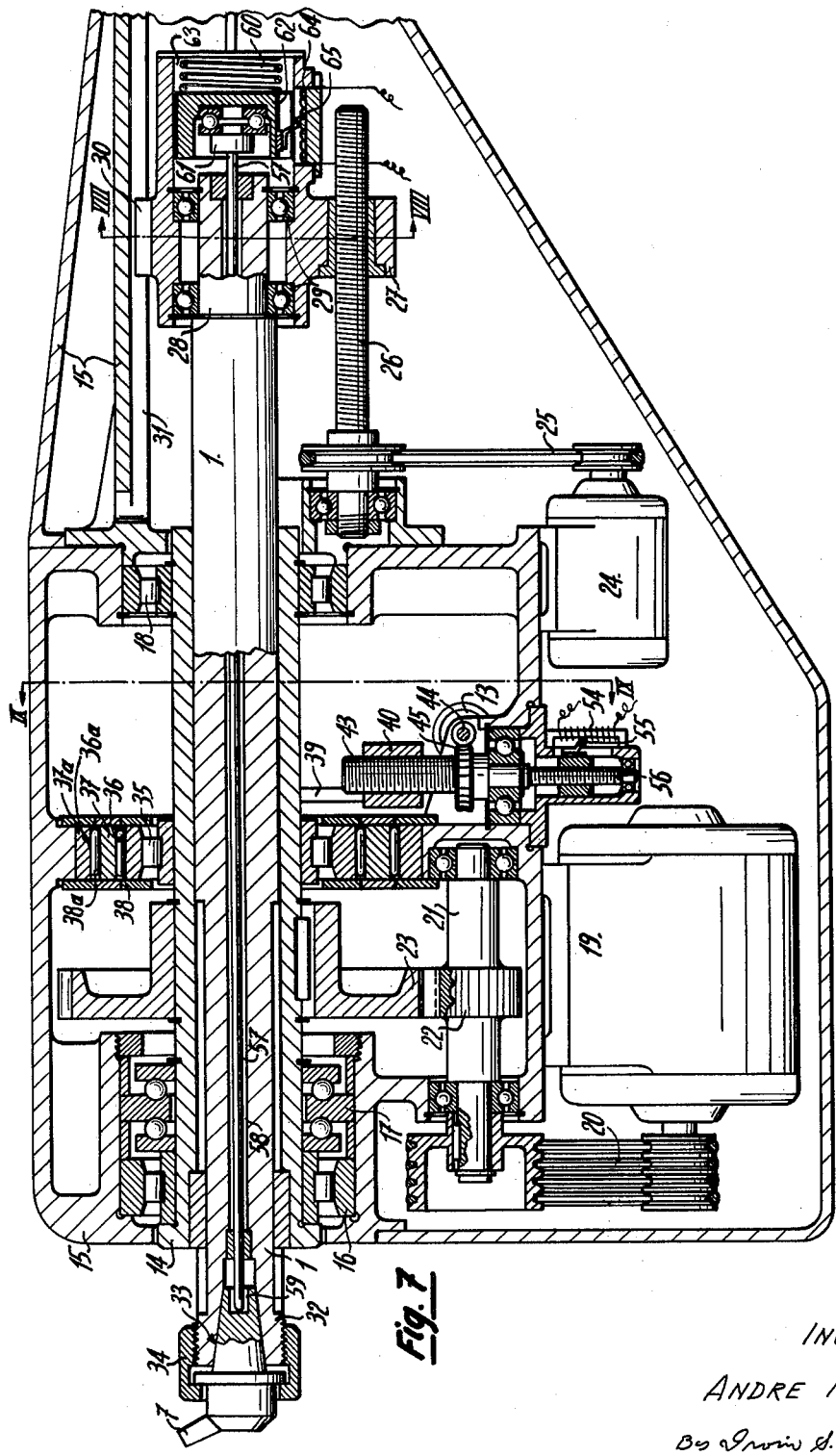
FIG. 7 is a cross sectional view of the spindle carrying headstock showing the spindle, its rotary and axial translation driving devices, as well as part of the device compensating for the deflection of the spindle.

(g) The amplifier 12 is only diagrammatically illustrated in FIG. 10. The complete diagram of said amplifier is to be found in Fig. 7-3 page 104 of "Servomechanism Practice" by W. R. Ahrendt, McGraw-Hill, 1954.

(h) The electric motor 13 is a two phase motor, one phase of which is fed by the feeding device 66 and the other by the output of the amplifier. The current flowing through said first mentioned phase is lagging behind the current I supplied by the amplifier due to the capacitor C.

In this way, the motor is actuated only when there is an output current I of the amplifier 12, that is, when the position of the movable bearing does not correspond to the state of the spindle (weight of the tool carried by the spindle and its axial position) that is, when the total deflection of the spindle is not completely compensated for.

Therefore, if the signal $ie$ changes, due to a modification of either the weight of the tool carried by the spindle or to the axial position of said spindle a signal I is delivered by the amplifier until the movable bearing has been displaced in such a way that the signal $ir$ will be again equal to the signal $ie$, that is, when the position of said movable bearing is such as to completely compensate for the deflection of the spindle.

It has already been indicated that the compensation of the deflection of the spindle 1 is obtained by a bending of the said spindle. In fact, in order to return the axis of the tool to the theoretical axis X of the spindle the movable bearing 4 is displaced downwards, which has the effect of bending downwards the portion of the spindle situated between its two fixed front and rear bearings 2 and 3. This causes an angular displacement of the axis of the spindle in a clockwise direction (FIG. 5) around the position where the spindle 1 projects out of the front bearing 2.

It is to be noted that the bending deformations of the spindle are of small amplitude, the variations between the theoretical axis X and the actual axis of the spindle being about a few hundredths of a millimetre at the most. Therefore, the angular displacement of the axis of the spindle in the bearings 2 and 3 are not disturbing and are absorbed in the thickness of the lubricant film. However, ball and socket bearings could be used for the front and rear bearings 2 and 3 of the spindle, in order to allow a free bending of the said spindle.

In the embodiment illustrated in FIGS. 7-10 the spindle 1 slides axially in a spindle carrying sheath 14 which is mounted in a sheath carrying headstock 15 at its front end by a roller bearing 16 and an axial abutment 17 and at its rear end by a ball bearing 18.

This spindle carrying the sheath 14 is driven in rotation by means of a driving device comprising a motor 19 actuating, through a belt transmission 20, an intermediary shaft 21 mounted on the headstock 15. This intermediary shaft 21 carries a pinion 22 which is in mesh with a toothed wheel 23 fixed to the spindle carrying sheath 14 and can be rotated with it.

This spindle 1 is axially displaced by means of an axial driving device comprising a motor 24 driving, through a belt transmission 25, a screw 26 which is in mesh with a nut 27 mounted on the rear extremity 28 of the spindle 1 by means of bearings 29 which enable the spindle 1 to rotate relatively to the nut 27. This nut 27 is axially fast with the spindle 1 and its angular position is fixed with respect to the headstock 15 by means of a finger 30, firm with the said nut 27 and slidably engaged in a slot 31 provided in the headstock 15.

This spindle 1 is further provided with a device for securing the tool 7 on its free end 32 which comprises a female taper 33 and a sleeve 34 maintaining the tool.

The device compensating for the deflection of the spindle 1 corresponds to that indicated diagrammatically in FIG. 6 and comprises a movable bearing for the spindle 1, displaceable in a direction perpendicular to the theoretical axis X under the action of an actuating device, the position of which is controlled, on the one hand, by the overhanging length L of the spindle 1 and, on the other hand, by the weight P of the tool 7 fixed at the free end 32 of the said spindle. This movable bearing for the spindle comprises a bearing 35, the outside cage of which has an outer peripheral surface 36 which is circular but eccentric with respect to the axis of the bearing 35. An intermediate ring 37, the inner peripheral surface of which is concentric to the surface 36, is pivoted on the latter by means of needles 38, for example. The outer peripheral surfaces of the said intermediate ring 37 is eccentric with respect to the inner surface of this ring and is pivoted by means of needles 38a in a bore 36a concentric to the axis of the bearing 35. The said bore 36a is made in a ring 37a which is secured to the headstock 15. Due to this disposition it is possible to displace the bearing 35 perpendicularly to the axis of the spindle, in a vertical direction for example, by angularly displacing the outer cage of the bearing 35 and the intermediate ring 37 through the same amplitude but in opposite directions.

The intermediate ring 37 and the outer cage of the bearing 35 are both connected by means of links 39 to a nut 40. It is important that the coupling point of the links 39 on the outer cage of the bearing 35 and on the intermediate ring 37 be located at the same distance from the axis of the bearing 35. Therefore, the link 39 connecting the nut 40 to the outer cage of the bearing 35 is fixed to the said outer cage 35 by means of a bracket 41.

The actuating device for the movable bearing of the spindle comprises a motor 13 driving a screw 43 which is in mesh with the nut 40 by means of a worm 44 which is in mesh with a worm-wheel 45. The axial position of the screw 43 is fixed with respect to the headstock 15 but can be rotated with respect to the latter by means of a ball abutment.

The motor 13 is a reversible motor and is controlled by the error signal I delivered by the amplifier 12. This error signal I is proportional to the distance through which the movable bearing has to be displaced in order to cause such a deflection of the spindle that the axis of the tool 7 will be superimposed upon the theoretical axis of the spindle 1, that is to say, in order that the deflection of the spindle 1 at its free end may be entirely compensated.

In this embodiment, the detector 5 comprises a cam 46 fixed on the headstock 15 and a feeler 47 mounted on the nut 27 for radial displacement therewith. The longitudinal displacements of the feeler 47 with respect to the cam 46 are thus identical to those of the spindle 1 with respect to the headstock 15. Following the profile of the cam 46, the feeler 47 drives a rubbing contact 48 of a linear potentiometer 49. The shape of the cam 46 is such that it effects displacements of the rubbing contact 48 as a function of the fourth power of the overhanging length of the spindle 1, that is to say, as a function of the deflection due to the weight of the said spindle itself. There thus appears on the rubbing contact 48 an electrical signal $ip$ which is a function of the deflection due to the weight of the spindle itself.

The detector 6 comprises a cam 50 fixed on the headstock 15 and a feeler 51 mounted on the nut 27 for radial displacement therewith. The longitudinal displacements of the feeler 51 with respect to the cam 50 are thus identical to the relative displacements of the spindle 1 with respect to the headstock 15. Following the profile of the cam 50, the feeler 51 drives a rubbing contact 52 of a linear potentiometer 53. The shape of the cam 50 causes the rubbing contact 52 to move as a function of the third power of the overhanging length of the spindle, that is to say, as a function of the amplitude of the deflection of the spindle due to the tool which it carries. There thus appears on the rubbing contact 52 an electrical signal $io'$ which is a function of the deflection due to a tool of unit weight carried by the spindle.

This signal $io'$ is delivered to the multiplier 8 (FIG. 6) which delivers in turn a signal $io$ which is a function of the deflection due to the actual weight of the tool carried by the spindle.

The multiplier 8 is constituted by a non-linear potentiometer 64 fed by the signal $io'$, the position of the rubbing contact 65 of which being determined by the weight of the tool by means of a mechanical linkage to be described later on.

The position detector 10 measures the position of the movable bearing and delivers a signal $ir$ proportional to the actual position of the movable bearing of the spindle 1. This position detector comprises a potentiometer 54 having a rubbing contact 55 which is driven by the motor 13 in displacements proportional to those of the movable bearing of the spindle, with the aid of a screw 56 fixed and coaxial with the screw 43.

Figure 3:
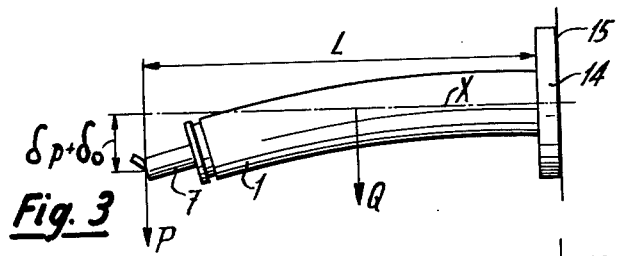
FIGS. 3 and 4 are views similar to FIG. 2 showing respectively, the deflection of the portion of the spindle extending out of the headstock under the combined action of its own weight and of the weight of a tool carried by the free end of the said spindle, when the said spindle carries a tool of light weight and of heavier weight.
Figure 4:
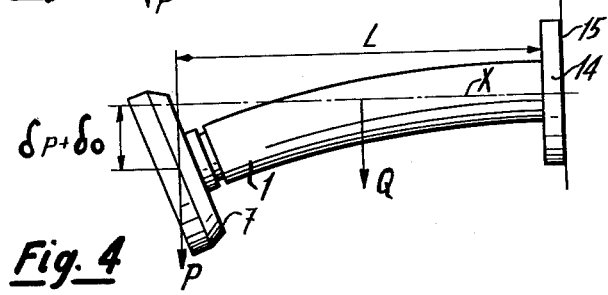

The multiplier 8 may be for example of the type described in "Handbook of Automation, Computation and Control," volume 2, edited by E. M. Grabbe, S. Ramo and D. E. Wooldridge; S. Wiley and Sons Publishers, 1959, pp. 22–04 and 22–05 (Fig. 3). The circuit 9 effecting the addition of the signals $ip$ and $io$ can be of the type described in "Vacuum Tube Amplifiers" by George E. Valley, Jr. and Henry Wallman, MIT Rad. Lab. Series, McGraw-Hill, 1948, p. 99, Fig. 2.29, or in "Handbook of Automation, Computation and Control," volume 2, edited by E. M. Grabbe, S. Ramo and D. E. Wooldridge; S. Wiley and Sons Publishers, 1959, pp. 22–05 and 22–06 (Fig. 5). The comparator 11 can be of the type described in "Servomechanism Practice" by Willian R. Ahrendt, McGraw-Hill, 1954, p. 13, Fig. 2–2, and the amplifier 12 can be of the type described in "Servomechanism Practice" by William R. Ahrendt, McGraw-Hill, 1954, p. 104, Figs. 7–3. All these circuits are of well known type and will not be described in further detail.

This compensating device for the deflection of the spindle 1 comprises further a device for setting the weight of the tool 7 carried by the spindle.

This setting device comprises a rod 57 sliding axially in a bore 58 which is co-axial to the spindle 1 and extends through all the length of said spindle. The front end of this rod 57 is intended to come in contact with the tool 7 against which it is resiliently applied by means of a spring 60 in the embodiment shown.

The rear face of each tool is provided with a recess or bore 59. The front end of the rod 57 is urged against the bottom of this recess 59. The depth of the recess 59 in any tool 7 is a function of the weight of that tool, so that the axial position of the rod 57, determined by the bottom or the deepness of the recess 59 when a tool is fixed in working position on the spindle, depends upon the weight of the tool carried by the spindle 1. The rear end 61 of this rod 57 drives in its displacements an end part 62 sliding axially in a housing 63 of the nut 27. The displacements of the said part 62 enable to determine as a function of the tool carried by the spindle the multiplying coefficient of the multiplier 8. Therefore, the end part 62 carries the rubbing contact 65 of the non-linear potentiometer 64 constituting the said multiplier 8. So for each position of said end part 62 corresponds a position of the said rubbing contact 65 and thus an electrical multiplying coefficient. In this way the signal $io'$ delivered by the detector 6 is automatically multiplied by the coefficient corresponding to the tool 7 carried by the spindle.

The described compensating device for the deflection of a spindle works as follows:

Before proceeding with a machining operation, the operator chooses and fixes an adequate tool on the free end 32 of the spindle 1. As soon as the tool is fixed in working position on the spindle the multiplying coefficient of the multiplier 8 is determined due to the tool weight setting device. Then the operator may proceed with the desired machining operation. For each axial position of the spindle 1, there corresponds a given position of the movable bearing for the said spindle so that the total deflection of the spindle is entirely compensated. Furthermore, the adjustment of the said position of the bearing is realized automatically due to the control device of the said bearing.

One embodiment has been shown and described but it is evident that numerous modifications could be made.

Particularly the detectors 5 and 6 could be very different as long as they respectively deliver a signal proportional to the third and to the fourth power of the overhanging length of the spindle. For example, it would be possible to provide for an optical detector, a pneumatic detector, or a mechanical detector of the axial position of the spindle and to elaborate from that information the two desired signals *ip* and *io'* by means of a computer. In another modification the detectors 5 and 6 could be similar to the ones described and illustrated but their cams 46 and 50 could have a rectilinear working profile. In such a modification the potentiometers 49 and 53 of said detectors would be non-linear potentiometers having characteristics such that the signals *ip* and *io'* would respectively be proportional to $L^4$ and $L^3$.

The multiplier could also be constructed in different ways as long at it is possible to multiply the signal *io'* by a coefficient depending upon the tool carried by the spindle. Particularly this multiplier could be constituted by a transducer or magnetic amplifier, the control winding of which would be fed by a current depending upon the tool carried by the spindle, or otherwise by a Hall generator. This multiplier could be constituted in another modification (FIG. 11) by a transformer, the primary winding of which is fed by the signal *io'* and the secondary winding of which has several taps each corresponding to the weight of a tool capable of being fixed on the spindle. The weight of the tool thus determines the particular taps between which the signal *io* has to be taken.

The detector of the position of the movable bearing could be realized differently as long as it enables a signal to be delivered indicating the actual position of the movable bearing of the spindle. Many well-known detectors could be used for that purpose.

The tool weight setting device could be different as well, as long as it enables the multiplying coefficient of the multiplier to be selected corresponding to the tool carried by the spindle. Such a device could be electrical, pneumatic or mechanical, etc.

In one modification the tool weight setting device could comprise an adjusting device enabling the exact position of the rod 57 to be adjusted for each desired tool. This adjusting device could, for example, make it possible to vary the extent to which the rod 57 may be introduced in the hole 59 of the tool.

It is evident that the position of the movable bearing could be differently constituted in other realizations. Particularly this movable bearing could constitute simultaneously either the front or the rear bearing of the spindle.

The present invention has, with respect to all known deflection compensating devices, the advantage of making it possible to effect total compensation of the deflection of the spindle, and this without causing any supplementary stress on the frame B or on the headstock 15 of the machine.

I claim:
1. A device for compensating for the deflection of an axially sliding spindle having a nonvertical axis, comprising at least a movable bearing for the spindle, means for controlling the position of said movable bearing according to the overhanging length of the spindle, and a setting device movable by a tool carried by the free end of the spindle, said setting device causing displacements of said movable bearing to a degree dependent on the amount of movement of said tool when supported by said spindle thereby to control the position of said movable bearing according to the weight of the tool carried by the spindle.

2. A device as claimed in claim 1, in which said means controlled by the overhanging length of the spindle acts on said movable bearing in proportion to the fourth power of the overhanging length of the spindle.

3. A device as claimed in claim 1, in which said setting device displaces said movable bearing in proportion to the third power of the overhanging length of the spindle.

4. A device for compensating for the deflection of an axially sliding spindle having a nonvertical axis, comprising at least a movable bearing for the spindle, means for causing displacements of said movable bearing according to the overhanging length of the spindle, and a setting device for causing displacements of said movable bearing according to the weight of a tool carried at the free end of the spindle so that whatever the axial position of the spindle or whatever the weight of the tool carried by the spindle, the axis of the tool will be always located on the theoretical axis of the spindle, said setting device comprising a rod resiliently urged against the tool carried by the spindle.

5. A device as claimed in claim 4, in which the axial position of said rod is a function of the weight of the tool carried by the spindle.

6. A device as claimed in claim 5, and a multiplier for causing displacement of said movable bearing in correspondence to the weight of the tool carried by the spindle, the axial position of said rod selecting automatically the multiplying coefficient of the multiplier.

References Cited by the Examiner
UNITED STATES PATENTS

| 2,432,943 | 12/47 | Shaw | 77—3 |
| 2,853,901 | 9/58 | Schraub | 77—3 |
| 3,097,568 | 7/63 | Kampmeier | 77—3 |

FOREIGN PATENTS 802,206 10/58 Great Britain.

WILLIAM W. DYER., JR., *Primary Examiner.*